Feb. 21, 1939.  A. D. MacLEAN.  2,147,850

GAS PRESSURE REGULATOR

Filed Feb. 20, 1935  3 Sheets-Sheet 1

INVENTOR.
Allen D. MacLean.

BY
Strauch & Hoffman
ATTORNEYS

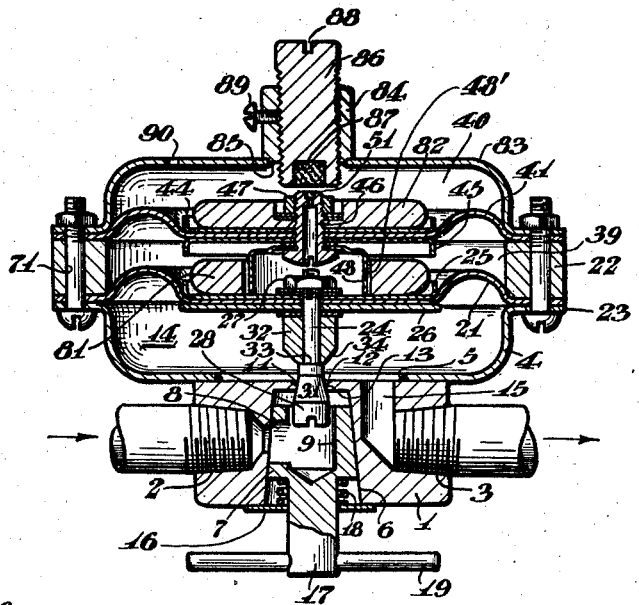
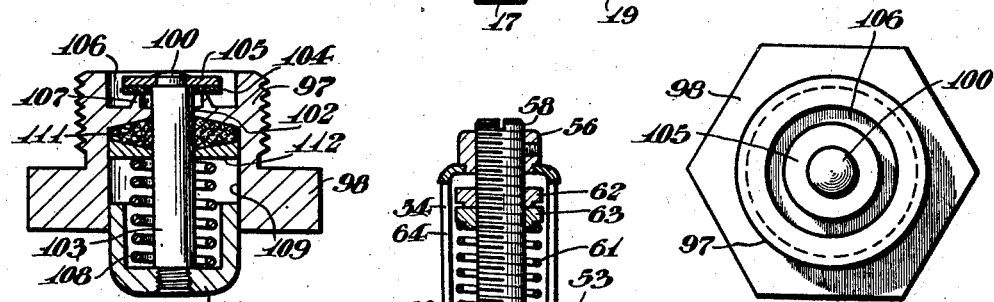
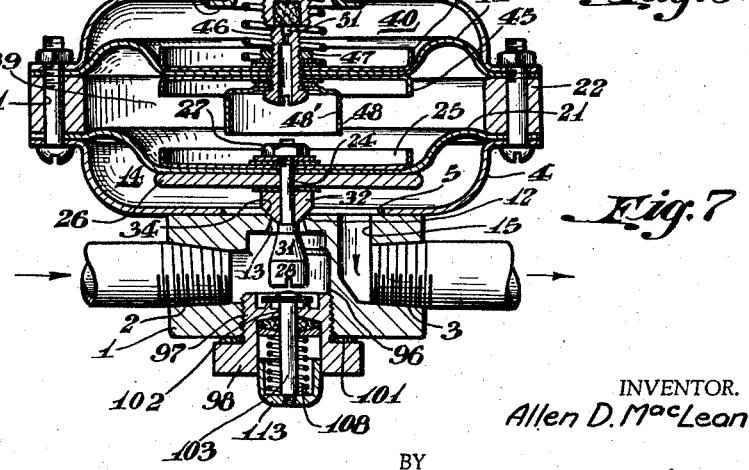

Feb. 21, 1939.   A. D. MacLEAN   2,147,850
GAS PRESSURE REGULATOR
Filed Feb. 20, 1935   3 Sheets-Sheet 3
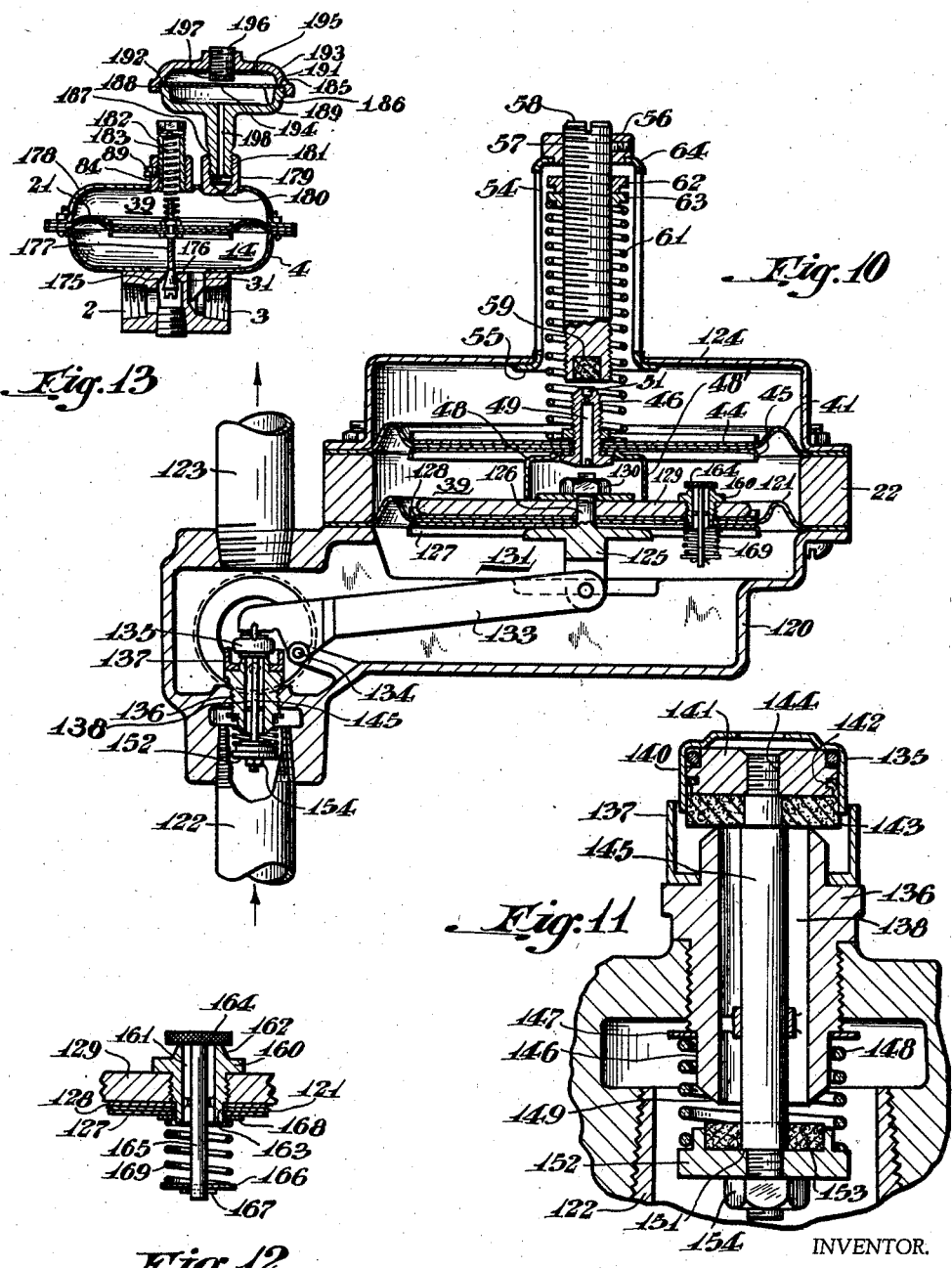
INVENTOR.
Allen D. MacLean.
BY Strauch & Hoffman
ATTORNEYS Patented Feb. 21, 1939

2,147,850

UNITED STATES PATENT OFFICE 2,147,850

GAS PRESSURE REGULATOR

Allen D. MacLean, Pittsburgh, Pa., assignor to Pittsburgh Equitable Meter Company, Pittsburgh, Pa., a corporation of Pennsylvania Application February 20, 1935, Serial No. 7,423

18 Claims. (Cl. 50—21)

The present invention relates to gas pressure regulators, and more particularly to safety gas pressure regulators of the diaphragm type having provision for cutting off the leakage of gas to the exterior when a flow of gas occurs through the regulator diaphragm for any cause.

Domestic gas appliances, such as gas refrigerators, gas furnaces and the like, employ a regulator to supply a flow of gas at a constant pressure to the appliance, such a regulator being shown in my U. S. Patent 1,984,592, issued to me on December 18, 1934. Because such regulators may be located in a confined space, such as a kitchen or cellar, it is not always convenient to connect the regulator vent to the outside. Also, it is usual to provide appliance regulators with a liquid safety seal to prevent the development of excessive pressure in the outlet of the regulator, and frequently the safety seal cannot be vented to the outside. Development of a leak in a regulator in such a confined space or blowing out of the liquid seal may cause a fire or explosion, and in the case of manufactured gas, may be poisonous. A leakage of over one and one-half cubic feet per hour is ordinarily considered dangerous.

According to the present invention, I provide a regulator having an equalization chamber, and excessive flow into the equalization chamber, such as would be due to a leak, or to the flow through a safety valve therein upon building up of excessive pressure in the outlet, discontinues the regulation of the gas supply and in addition may close a secondary shut off valve which cuts off the supply of gas, and thereby warns the user that the regulator is defective. The secondary shut off valve will be maintained closed so that the defective part must be repaired before it will again permit flow, and in certain cases I provide a retractible element for manually unseating the secondary valve to resume operation of the regulator. My invention is particularly applicable in those installations where it is not convenient to pipe the regulator vent to a point outside the building in which it is used. If desired, my invention can be used in connection with an audible or visible signal to indicate when a leak in the diaphragm occurs or excessive pressure is built up.

In the preferred embodiment of the invention embodying a diaphragm controlled regulator valve an auxiliary diaphragm is spaced a predetermined minimum distance from the regulator diaphragm to provide a spacer chamber or equalization chamber therebetween, the two diaphragms moving in unison as one diaphragm during the normal operation of the regulator. A small orifice is provided in the auxiliary diaphragm which cooperates with an orifice valve, and when gas enters the spacer chamber faster than it can escape through said orifice due to leakage or breakage of the regulator diaphragm, or development of excessive outlet pressure, or for any other cause, the auxiliary diaphragm acts to close said orifice and the regulator diaphragm closes the secondary shut off valve. The closing of the secondary valve gives warning of trouble in the regulator.

Accordingly, one object of the present invention is to provide a safety gas appliance regulator embodying a pressure operated valve having means for preventing leakage above a predetermined safe rate and for rendering the regulator valve inoperative upon excessive leakage or rupture of the diaphragm.

Another object is the provision of a safety gas appliance regulator embodying a diaphragm operated valve with means for closing the flow of gas therethrough upon excessive leakage or rupture of the diaphragm, said means remaining operative during the existence of the condition causing leakage.

Another object is the provision of a safety gas pressure regulator which will shut off the supply of gas when the outlet pressure rises to excessive limits.

Another object is the provision of a safety gas pressure regulator which does not require a vent connection to the outside of the building in which it is used.

Another object is the provision of a gas pressure regulator and manual shut-off valve combined in a unitary structure, whereby the gas can be shut off during the period repairs are being made.

A further object is the provision of a safety gas regulator which is simple in construction, inexpensive to manufacture and positive in operation.

These and further objects of the invention will be apparent from a consideration of the following detailed description of a preferred embodiment of the invention taken in connection with the accompanying drawings in which:

Figure 6 is a view similar to Figure 2 of a modification employing a weight loaded diaphragm;

Figure 7 is a view similar to Figure 2 of a further modification in closed position and embodying a manual starter attachment;

Figure 8 is a vertical section on an enlarged scale of a detail of Figure 7;

Figure 9 is a plan view of Figure 8;

Figure 10 is a vertical section of a further modification;

Figure 11 is a vertical section on an enlarged scale of the shut-off valve in Figure 10;

Figure 12 is a vertical section on an enlarged scale of the safety valve in Figure 10; and Figure 13 is a vertical section showing my invention attached to an ordinary regulator.

Figure 1:
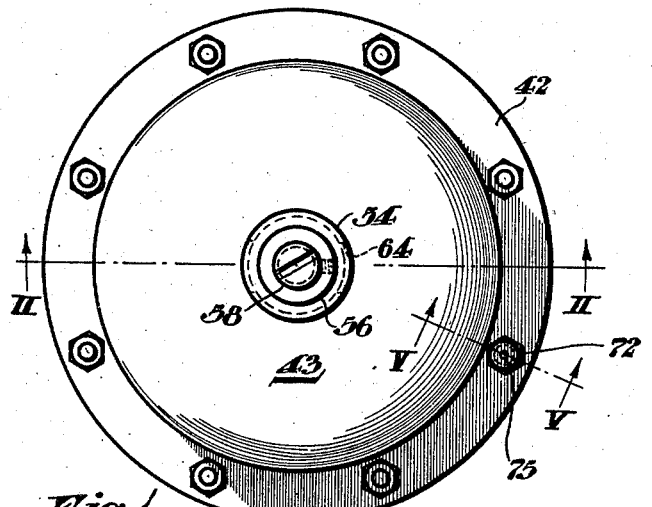
Figure 1 is a top plan view of a preferred embodiment of my invention.
Figure 3:
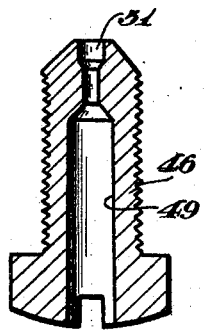
Figure 3 is a vertical sectional view of a detail.

Referring to Figures 1 to 5 of the drawings wherein is shown the preferred embodiment of my invention, the regulator comprises a steel block 1 comprising a body portion having threaded inlet and outlet connections 2 and 3 respectively, and an inverted flanged dish shaped member 4 of sheet steel having a large aperture 5 through the bottom thereof is welded or otherwise secured to the top thereof. The bottom of the body portion 1 has a tapered bore 6 therein forming a seat in which is fitted a tapered plug 7 to form an angle cock, and having a lateral passageway 8 therethrough connected with the inlet 2 at one end and connected to the vertical passage 9 formed longitudinally in the plug 7. An opening 11 formed at the top of the body 1 has the valve seats 12 and 13 formed on opposite sides thereof and communicates with the interior of the regulator chamber 14. The outlet 3 communicates through vertical passage 15 with the regulator chamber 14. The lower end of the tapered seat 6 is closed by a plate 16 and an integral stem 17 on the plug extends through a suitable opening therein. A spring 18 is interposed between the plate 16 and shoulder of the plug 7 to resiliently hold the plug in its seat, and a handle 19 is provided extending through the operating stem 17 of the valve for opening and closing the same.

The regulator chamber 14 is closed at its upper end by a pressure responsive means such as the regulator diaphragm 21 held between spacing ring 22 and flange 23 of the sheet steel dish 4 by bolts or other suitable means, and at its center carries a valve stem 24 upon which are secured the reenforcing plate 25 and weight 26 by the nut 27 threaded on the end of the valve stem. The valve stem 24 carries at its lower end a thickened portion 28 having a tapered regulator valve face 31 adapted to cooperate with the valve seat 13. A sleeve 32 fits on the valve stem and abuts the shoulder 33 thereon, the tapered shut-off valve face 34 thereof being adapted to cooperate with the valve seat 12.

An auxiliary diaphragm 41 is held at its outer periphery between the spacer 22 and the flange 42 of cover plate 43 by bolts or other suitable means. The second diaphragm 41 carries two plates 44 and 45 held by a screw 46 and nut 47, and the diaphragms 21 and 41 are maintained in fixed spaced relation by a spacer 48 made of sheet metal or any other suitable material forming a spacer chamber 39 not attached to plate 25 and held in position by the screw 46. A hole 48' is provided in the wall of spacer 48 to allow equalization of pressure inside and outside of the spacer. The screw 46 is bored as indicated at 49 and adjacent its upper end the bore is reduced to a very small opening 51. The cover 43 forms a vent chamber 40 through the central opening 53 in which is located a spring receiver 54 having a flanged bottom 55 welded to the plate 43. At its upper end a collar 56 is pressed into the spring receiver and is bored and threaded as indicated at 57 to receive a threaded seat carrier 58 having an inserted seat 59 of some soft material such as "Paraprene" in its lower end. The weight 26 is selected to provide the lower pressure limit for the regulator, and a spring 61 bearing against the upper diaphragm 41 reacts through the spacer 48 against the lower diaphragm 21 and provides an adjustment of the load on the regulator diaphragm up to the upper pressure limit of the regulator. A threaded nut 63 is threaded on the stem or seat carrier 58 and bears against the spring 61 to adjust the load on the regulator diaphragm 21 and is locked by nut 62, the nuts being accessible through the wide slots 64 in the spring housing which also serve as a vent for chamber 40.

Th operation of the apparatus now will be described. Ordinarily the diaphragm 21, which is loaded by weight 26, is governed by the pressure in the outlet 3 to maintain a constant pressure therein. When a higher outlet is desired the spring 61 is compressed by turning nut 63, the pressure of the spring serving normally to hold the diaphragm 41 down to keep the vent screw 46 spaced from the seat 59. The spacer 48 limits downward movement of diaphragm 41 and transmits the spring load to diaphragm 21. When operating in this way variations in the outlet pressure raise or lower the diaphragm 21 and valve 31 therewith which controls the flow of fluid through the valve opening 11 between the inlet 2 and outlet 3. During such movement the spacer 48 maintains the diaphragm 41 at a constant distance from the diaphragm 21, and the spacer chamber 39 therebetween does not appreciably vary in volume, the vent 51 connecting chamber 39 with the atmosphere. Should a leak develop in the diaphragm 21 the gas will enter the intermediate chamber 39 through the leak and will flow through the hole 51 in the vent screw 46 into the upper chamber 40 which is vented to the atmosphere through slots 64. As long as this leak is small, as for example, a flow of one half cubic foot per hour, the leaking gas can escape through the hole 51 into the top chamber, and from thence to the atmosphere, but should the leak become larger than the flow capacity of vent 51, pressure will build up in chamber 39 and will counterbalance the spring 61 causing the upper diaphragm 41 to rise and bring the end of opening 51 in the screw against the valve seat 59, thereby stopping flow therethrough. The pressure in chamber 39 and the weight 26 will cause the lower diaphragm 21 to fall and bring the shut off valve face 34 against the valve seat 12 and completely shut off the supply of gas to the outlet 3 as shown in Figure 7. Before gas service can be restored at the outlet 3 it is necessary that the regulator diaphragm 21 be repaired.

Figure 2:
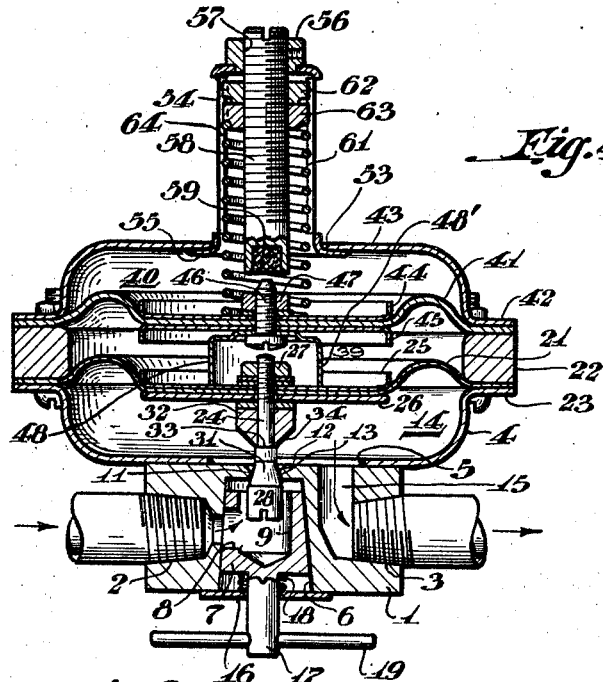
Figure 2 is a vertical section taken on line II—II of Figure 1.
Figure 4:
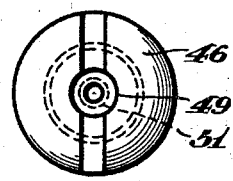
Figure 4 is a bottom elevation of the detail shown in Figure 3.

When repairs are necessary, the plug valve 7 is turned to a position at right angles to that shown in Figure 2, whereby the inlet connection 2 is cut off from the regulator chamber 14, and repairs can be made. The plug 7 may be omitted, if this feature is not desired, in which case the plug 7 is removed, and the tapered bore 6 is closed by a threaded plug. If desired, the valve 34 may be omitted, in which case the regulator valve 31 merely will be rendered inoperative upon building up of an excessive pressure in the equalization chamber 39. Also, it will be understood that in place of the auxiliary diaphragm 41 an inflexible member having an orifice therein may be employed, the valve seat member being secured to and movable with the diaphragm 21.

Figure 5:
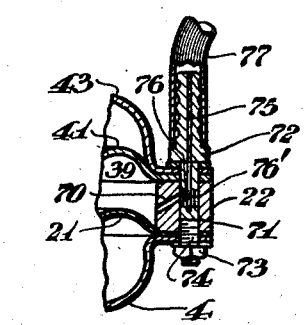
Figure 5 is a section taken on line V—V of Figure 1, the bolt being replaced by a test connection.

In Figure 5 is shown an arrangement for testing my new safety regulator. A hole 70 is bored in the spacer ring 22 inwardly until it meets one of the bolt holes 71 therein. For testing, the bolt is removed therefrom and is replaced by a connector 72 which is suitably held in place by a nut 73 on the threaded end 74, and has a vertical hole 75 therein connecting through a lateral hole 76 and reduced portion 76' with the hole 70. For testing, a gas hose is connected at 77 to the connector 72, the other end thereof leading to the outlet 3, and by permitting flow therethrough into the spacer chamber 39 the action of the safety device may be checked. By means of the threaded seat carrier 58 the valve seat 59 can be adjusted the correct distance from the orifice 51 to secure correctly timed closing of the orifice.

In Figure 6 is shown a modification employing a weight for loading the diaphragm, like parts being designated by the same reference numerals. The diaphragm 21 carries the weight 26 and reenforcing plate 25 as previously described, and a weight 81 is placed on the plate 25. This weight has a central aperture to receive the spacer 48 which is held by hollow screw 46 as previously described. The diaphragm 41 likewise carries the two plates 44 and 45, and in addition carries the weight 82 held in place by screw 46 and nut 47. The top plate 83 has an internally threaded nipple 84 welded or otherwise secured in a central hole 85 therein and receives a threaded seat carrier 86 having a valve seat 87 inserted in the end thereof. The location of the valve seat with relation to the end of the screw 46 can be adjusted by turning the carrier 86, a slot 88 being provided in its end for this purpose, and a set screw 89 holds the carrier in set position. A separate vent hole 90 is provided in the cover.

The operation of this modification is like that shown in Figures 1 to 4. The weights 81 and 26 provide a fixed minimum load for the diaphragm and the weight 82 can be replaced by other weights for adjusting the outlet pressure of the regulator. When leakage into chamber 39 becomes too great the pressure in chamber 39 builds up and forces the diaphragm 41 upward against the weight 82 thus closing the orifice 51 against the valve seat 87. Thereupon, the weights 26 and 81 force the diaphragm 21 downward and close the shut off valve 34 against its seat 12.

In Figures 7 to 9 is shown a modification employing a starting device in place of the valve 7, the construction being otherwise the same as that shown in Figures 1 to 4. This apparatus is shown in shut off position. The block 1 has a central bore 96 therein which is suitably threaded and receives a bushing 97 having a hexagonal flange 98 sealed with respect to the block by a gasket 101. The bushing is bored at 102 to receive a rod 103 which carries at its inner end a soft valve 104 backed by a metal washer 105, the assembly being riveted or otherwise suitably secured to the end 100 of rod 103. The bushing 97 is counterbored at 106 and has a sharp edge 107 formed about the rod 103 against which the valve 104 is adapted to be urged by a spring 108. The bushing is bored at 109 and provides a packing recess containing the packing 111 and the spring 108 presses the follower 112 against the packing. A button or knob 113 is suitably secured at the other end of rod 103 and is adapted to slide in the bore 109, this knob serving also as an abutment for spring 108.

In operation, after a leak has occurred and the regulator has been closed, the valve face 34 will be seated down against the valve seat 12 as shown in Figure 7. After the diaphragm 21 has been repaired and the regulator reassembled the valve 34 will be in closed position since the inlet pressure acting against valve 34 is not sufficient to overcome the load on the diaphragm. To start the regulator the button 113 is pushed upward against the spring 108 whereby the end 100 of the rod 103 engages the lower end 28 of rod 24 and raises the valve 34 off of its seat. The flow into regulator chamber 14 thereupon is resumed and operation of the mechanism as a regulator is restored.

In Figures 10, 11 and 12 is shown a modification of my invention applied to a pressure booster regulator such as that shown and described in the application of Fritz Neisemann, Serial No. 736,595, filed July 23, 1934. This regulator consists of a lower shell 120 having inlet and outlet connections 122 and 123 formed at one end thereof. The top of the shell is closed by a diaphragm 121 secured in place by the spacer ring 22, and the diaphragm 41 above the spacer is clamped between cover 124 and spacer 22 by suitable bolts provided for securing the assembly together. An attachment lug 125 has a threaded stem 126 passing through the center of the diaphragm 121, the plates 127 and 128, and the weight 129, all of which are secured thereon by the nut 130 threaded on the end of the stem 126. The diaphragm 121 thereby forms one wall of the regulator chamber 131. The other end of the attachment lug 125 is pivotally connected to a lever 133 which in turn is pivoted at 134 and carries at its end a detachable valve seat member 135. A hollow bushing 136 having a bore 138 therethrough is threaded into the inlet of the lower shell and has a sleeve 137 surrounding a reduced portion to provide for a pressure boost in the outlet 123 upon increase in flow in the outlet as described in said application of Fritz Niesemann.

The valve seat member 135 comprises an outer cup like shell 140 of brass or other suitable material within which is secured the valve seat comprising a disk 141 of steel or other suitable material having an undercut groove 142, and a seat 143 of "Paraprene" vulcanized thereto. The disk 141 and "Paraprene" seat 143 have a central hole formed therethrough which is threaded in the disk as indicated at 144, and a closure valve stem 145 having a threaded reduced end is threaded into place therein and is suitably guided for longitudinal movement in bore 138. At its opposite end the bushing 136 has a reduced portion 146 which is surrounded by a washer 147 and receives a spring 148. The end of the bushing is machined on a taper as indicated at 149 to provide a sharp valve edge. The opposite end of rod 145 has a shoulder 151 against which abuts a shut off valve seat member comprising a plate 152 receiving a soft seat material 153 in a recess therein, the plate being held in place by a nut 154, and the spring 148 abutting the plate adjacent its outer periphery.

A hole is formed through the weight 129, plate 128, diaphragm 121 and plate 127, the hole through the weight being threaded to receive a bushing 160. The bushing 160 has a bore 161 therethrough and its upper end is turned on a taper as indicated at 162 to provide a sharp edge valve member. The lower end of the bushing is reduced as indicated at 163 where it passes through the pan 128, diaphragm 121 and pan 127. A safety valve seat member 164 of suitable soft material is secured to one end of a rod 165, the rod being suitably guided for longitudinal movement through the bore in bushing 160 and has a washer 166 secured against removal at its outer end by a cotter pin 167. A washer 168 fits over the reduced end of the bushing 160, and the spring 169 resting on this washer at one end and against the plate 165 at the other end maintains the seat 164 compressed against the valve edge 162.

In operation gas enters the regulator through the inlet 122 and the bore 138 and exerts its influence in the regulator chamber 131 upon the diaphragm 121 whereby the pressure in the outlet 123 is governed in accordance with the setting of spring 61. Upon increase in demand causing increased flow through outlet 123, the pressure is boosted by the flow of gas between the valve 135 and sleeve 137 as described in said application. If a leak develops in diaphragm 121, the pressure builds up in chamber 39 and operates to raise the diaphragm 41 against the action of spring 61 and bring the end of screw 46 against the valve seat member 59, thereby shutting off the flow through orifice 51. The pressure in chamber 39 counterbalances spring 61 and causes the diaphragm 121 to drop downward. This raises the valve member 135, and ordinarily would permit even a greater flow of gas through the valve to build up a higher pressure in outlet 123. However, the raising of valve 135 also raises the stem 145 connected thereto and brings the soft shut off valve seat 153 against the valve edge 149 thus closing off the flow of gas through the bore 138 in the bushing. Once closed, the inlet pressure of the gas in inlet 122 will keep the valve 153 closed until the diaphragm has been repaired.

When employed as a safety valve to prevent building up of excessive pressure boost in the outlet of the regulator, the valve 164 ordinarily is kept seated against the valve edge 162 by the spring 169, and when the pressure in regulator chamber 131 rises higher than the setting allowed for by spring 169 the valve 164 is raised off its seat 162 thus permitting flow into the chamber 39 at a rate sufficient to raise the diaphragm 41 and screw 46 against the valve seat 59, and causes the lower diaphragm 121 to drop and close the valve 153 against its seat.

The present invention may be embodied in a separate attachment to the vent of a regulator to render the regulator inoperative as a flow control means.

In the modification disclosed in Figure 13 there is shown an attachment unit adapted to be connected to the vent of an ordinary appliance regulator. In this modification the valve 31 cooperates with a valve seat 175 to regulate the flow of fluid through passage 176 between the inlet 2 and outlet 3. The valve 31 is connected by a stem 177 with the regulator diaphragm 21, which maintains a constant outlet pressure in known manner. The diaphragm edge is clamped between the lower casing 4 and upper casing 178 and provides an equalization chamber 39 over the diaphragm. The cover 178 has a sleeve 179 welded thereto provided with a vent 180 and is internally threaded as indicated at 181. A central sleeve 84 receives an externally threaded hollow nipple 182 within which is located a spring 183 bearing on the diaphragm 21, and it will be seen that turning nipple 182 adjusts the load of the spring on the diaphragm.

A safety assembly indicated generally by the numeral 185 consists of a lower shell 186 having a threaded tubular extension 187 with a passage 188 therethrough which threads into the vent nipple 179, and the shell 186 is threaded at 188 adjacent the top. A diaphragm 189 rests on the face 191 and is held in place by a shoulder 192 on a cover 193 threaded to the bottom shell. A very small hole 194 is provided in the diaphragm to permit a flow of about one-half cubic feet per hour therethrough, and a vent 195 permits escape of gas from the casing. A threaded stem 196 has a soft seat 197 thereon and cooperates with the orifice 194 in the diaphragm.

The operation of this modification now will be described. When a leak occurs in diaphragm 21 greater than the flow capacity of orifice 194 the pressure builds up in equalization chamber 39 until the outlet pressure in outlet 3 of the regulator is balanced by the pressure in chamber 39, thus permitting the spring 183 to move the diaphragm 21 and regulator valve 31 to open position, and the pressure built up in chamber 39 transmitted through vent 180 and nipple 187 closes the orifice 194 against valve member 197 and prevents further passage of gas therethrough. In this modification it will be seen that when valve 31 opens the gas passes from inlet 2 to outlet 3 without any control of pressure, there being no shut off provided.

The invention may be embodied in other specific forms without departing from the spirit or essential characteristics thereof, and the present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pressure regulator comprising a casing having an inlet and an outlet, a valve, pressure responsive means for operating the valve to control flow between the inlet and outlet, a secondary valve, means providing for passage of gas through said pressure responsive means when the pressure in the outlet reaches a predetermined maximum, means providing for escape of gas which passes through said pressure responsive means at a predetermined maximum rate of flow, means for closing said escape means when the passage of gas through said pressure responsive means reaches said predetermined maximum, and means for operating said secondary valve to cut off communication between said inlet and outlet.

2. A pressure regulator comprising a pressure responsive means to control flow through the regulator, a second pressure responsive means providing a pressure equalization chamber therewith and in which a normally open orifice is provided to allow the passage of a predetermined maximum flow of gas, means to close said orifice when the predetermined maximum flow of gas is reached, and means to stop the flow of gas through the regulator when said predetermined maximum flow is reached.

3. A pressure regulator comprising a casing having an inlet and an outlet, a valve, a regulator diaphragm responsive to pressure for operating the valve to control flow between the inlet and outlet, a second diaphragm having an orifice therethrough, an orifice valve, said second diaphragm and orifice being movable to close against said orifice valve when the passage of gas through said regulator diaphragm reaches a predetermined maximum, a secondary valve, and means connecting said secondary valve and regulator diaphragm, said regulator diaphragm being operated upon closing of said orifice to operate said secondary valve to cut off communication between said inlet and outlet.

4. A pressure regulator comprising a casing having an inlet and an outlet, a valve, a regulator diaphragm responsive to pressure on one side thereof for operating the valve to control the flow between the inlet and outlet, a second diaphragm having an orifice therethrough, means for maintaining said diaphragms spaced a predetermined minimum distance, an orifice valve, said second diaphragm being movable independent of the regulator diaphragm to close said orifice against the orifice valve when gas passes into the space between the diaphragms at a predetermined maximum flow, a secondary valve, and means connecting said secondary valve and regulator diaphragm, said regulator diaphragm being operated upon closing of said orifice to operate said secondary valve to cut off communication between said inlet and outlet.

5. A pressure regulator comprising a casing having an inlet and an outlet, a valve, a regulator diaphragm responsive to pressure for operating the valve to control flow between the inlet and outlet, a load on said diaphragm, a second diaphragm having an orifice therethrough, means for maintaining said diaphragms spaced a predetermined minimum and providing a space therebetween, a cover for said second diaphragm having a vent therein, an orifice valve seat associated with said cover, said second diaphragm and orifice being relatively movable to close against said valve seat when the passage of gas through said first diaphragm reaches a predetermined maximum, thereby building up a pressure in said space, a secondary valve, and means connecting said secondary valve and regulator diaphragm whereby movement of said regulator diaphragm in response to built up pressure in said space operates said secondary valve to cut off communication between said inlet and outlet.

6. A regulator comprising a casing having an inlet and an outlet, a valve, a regulator diaphragm responsive to pressure for operating the valve to control flow between the inlet and outlet, a weight on said diaphragm, a second diaphragm having an orifice therethrough, means for maintaining said diaphragms spaced a predetermined minimum providing a space therebetween, an adjustable spring load on said diaphragms, an orifice valve seat, said second diaphragm and orifice being movable to close against said orifice valve seat when gas passes into said space between the diaphragms at a predetermined maximum flow, a secondary valve, and means connecting said secondary valve and regulator diaphragm whereby the building up of pressure in said space moves said regulator diaphragm to operate said secondary valve and close off communication between said inlet and outlet.

7. A safety pressure regulator comprising a casing having an inlet and an outlet, a valve, a regulator diaphragm responsive to pressure for operating the valve to control flow between the inlet and outlet, a weight on said diaphragm, a second diaphragm having an orifice therethrough, a spring load on said second diaphragm, means for transmitting said spring load to said first diaphragm including a spacer maintaining said diaphragms a predetermined minimum distance apart to provide a space therebetween, an orifice valve seat, said second diaphragm and orifice being movable to close against said orifice valve seat when gas passes into said space between the diaphragms at a predetermined maximum flow, a secondary valve, and means connecting said secondary valve and regulator diaphragm whereby the building up of pressure in said space moves said regulator diaphragm to operate said secondary valve and close off communication between said inlet and outlet.

8. A safety pressure regulator, comprising a casing having an inlet and an outlet, a valve, a regulator diaphragm responsive to pressure for operating the valve to control flow between the inlet and outlet, a second diaphragm having an orifice therethrough, means for maintaining said diaphragms spaced a predetermined minimum, an orifice valve seat adjustable relative to said orifice, said second diaphragm and orifice being movable to close said orifice against said orifice valve seat when gas passes into the space between the diaphragms at a predetermined maximum flow, a secondary valve, and means connecting said secondary valve and regulator diaphragm whereby the building up of pressure in said space moves said regulator diaphragm to operate said secondary valve and close off communication between said inlet and outlet.

9. A safety pressure regulator comprising a casing having an inlet and an outlet, a valve, a regulator diaphragm responsive to pressure for operating the valve to control flow between the inlet and outlet, a second spaced diaphragm having a metal center having an orifice therethrough, a relatively soft orifice valve seat, said second diaphragm and orifice being movable to close said orifice against said orifice valve seat when gas passes into the space between the diaphragms at a predetermined maximum flow, a secondary valve, and means connecting said secondary valve and regulator diaphragm whereby the building up of pressure in said space moves said secondary valve and close off communication between said inlet and outlet.

10. A safety pressure regulator comprising a casing having an inlet and an outlet, a valve, a regulator diaphragm responsive to pressure for operating said valve to control flow between the inlet and outlet, a second diaphragm having a pair of centrally disposed plates secured thereto by a screw having a longitudinal orifice therethrough, a spacer held by said screw for maintaining said diaphragms spaced a predetermined minimum, an orifice valve seat, said second diaphragm being movable to close said orifice against said orifice valve seat at passage of gas into the space between the diaphragms at a predetermined maximum flow, a secondary valve, and means connecting said secondary valve and regulator diaphragm whereby the building up of pressure in said space moves said regulator diaphragm to operate said secondary valve and close off communication between said inlet and outlet.

11. A safety pressure regulator comprising a body having an inlet and an outlet and a regulator chamber, said body having a passageway connecting said inlet with said regulator chamber, and a passageway connecting said outlet with said regulator chamber, a diaphragm forming one wall of said regulator chamber and providing a space on the opposite side thereof, a valve seat formed on one side of said passageway, a valve connected to said diaphragm and cooperating with said valve seat to control flow through said passageway, a second valve seat at the opposite end of said passageway, and a secondary valve connected to said diaphragm, a load on said diaphragm, orifice means providing for escape of gas from said space at a predetermined rate of flow, and means operable by pressure in said space for closing said orifice, said diaphragm operating to close said secondary valve against its seat when the passage of gas through said diaphragm reaches a predetermined maximum and said orifice is closed.

12. A safety pressure regulator comprising a body having an inlet and an outlet and a regulator chamber, said body having a passageway connecting said inlet with said regulator chamber and a passageway connecting said outlet with said regulator chamber, a diaphragm forming one wall of said regulator chamber, a valve seat formed on one side of said passageway, a valve connected to said diaphragm and cooperating with said valve seat to control flow through said passageway, a second valve seat at the opposite end of said passageway, a secondary valve connected to said diaphragm, a second diaphragm spaced from said first diaphragm a predetermined minimum distance and having an orifice therethrough, an orifice valve seat cooperating with said orifice, a load on said second diaphragm transmitted to said first diaphragm, the passage of gas into the space between the said diaphragms faster than it can escape through said orifice, causing said second diaphragm to move against the action of said second load to relieve the first diaphragm of said load whereby the first diaphragm moves said secondary valve against said second seat.

13. A safety pressure regulator comprising a casing having an inlet and an outlet, a valve, pressure responsive means for operating the valve to control flow between the inlet and outlet, a secondary valve, a safety valve providing for passage of gas through said pressure responsive means when the pressure in the outlet reaches a predetermined maximum, means providing for escape of gas which passes through said safety valve at a predetermined maximum rate of flow, means for closing said escape means when the passage of gas through said safety valve reaches said predetermined maximum, and means for operating said secondary valve to cut off communication between said inlet and outlet.

14. A safety pressure regulator comprising a casing having an inlet and an outlet, a valve, pressure responsive means subject on one side thereof to the outlet pressure for operating the valve to control flow between the inlet and outlet, a pressure equalization chamber being provided on the other side of said pressure responsive means, normally open means providing for escape of gas which passes through said pressure responsive means from the equalization chamber at a predetermined maximum rate of flow, means for closing said escape means when the passage of gas through said pressure responsive means reaches said predetermined maximum, means for cutting off communication between said inlet and outlet, manually operated axially movable means extending into said casing for manually unseating said last named means, and a spring normally retracting said unseating means.

15. A pressure regulator comprising a casing having an inlet and an outlet, a valve, a regulator diaphragm responsive to pressure on one side thereof for operating the valve to control flow between the inlet and outlet, a second diaphragm having an orifice therethrough, means for maintaining said diaphragms spaced a predetermined minimum distance, an orifice valve, said second diaphragm being movable independent of the regulator diaphragm to close said orifice against the orifice valve when gas passes into the space between the diaphragms at a predetermined minimum flow, and means communicating with said space providing a flow in excess of the capacity of said orifice for testing the regulator.

16. A pressure regulator comprising a casing having an inlet and an outlet and a regulator chamber, a regulator valve, a spring loaded diaphragm forming one wall of said regulator chamber and subject to the pressure on the outlet side for operating the valve to control flow between the inlet and outlet, and means providing a space on the opposite side of said diaphragm and immediately adjacent thereto, a vent orifice in said means to permit escape of gas from said space, a valve means operable by pressure in said space for closing said orifice when gas flows into said space at a rate greater than it can escape through said orifice, and a secondary valve connected to said diaphragm to shut off flow between said inlet and outlet when said orifice has been closed.

17. In combination in a fluid pressure regulator, an inlet and an outlet, a valve seat between said inlet and outlet, means to control the pressure of the fluid discharged from said outlet comprising a diaphragm, and a valve connected to said diaphragm to engage said valve seat and control the flow of fluid passing from said inlet to said outlet, a second diaphragm adjacent said first diaphragm, an orifice in said second diaphragm to permit the escape of gas leaking through said first diaphragm and from the space between said diaphragms, means adjacent said second diaphragm to close said orifice when the rate of leakage of gas escaping through said first diaphragm exceeds the rate at which it can escape through said orifice to increase the pressure between said diaphragms and move said first diaphragm to a non-regulating position, and resilient means arranged to impose a predetermined load on said first diaphragm when in regulating position, said means becoming inoperative with respect to said first diaphragm as said first diaphragm goes to a non-regulated position.

18. In combination a fluid pressure regulator, an inlet and an outlet, a valve seat between said inlet and outlet, means to control the pressure of the fluid discharged from said outlet comprising a diaphragm, and a valve connected to said diaphragm to engage said valve seat and control the flow of fluid passing from said inlet to said outlet, a partition within said casing adjacent said diaphragm, orifice means in said partition to permit the escape of gas leaking through said diaphragm from the space between said diaphragm and said partition valve means adjacent said partition to close said orifice means when the rate of leakage of gas escaping through said diaphragm exceeds the rate at which it can escape through said orifice to thereby increase the pressure between said diaphragm and partition, and resilient means biasing said orifice means and valve means and imposing a predetermined load on said diaphragm during the regulating movements thereof.

ALLEN D. MacLEAN.